(12) United States Patent
Mase et al.

(10) Patent No.: US 9,114,599 B2
(45) Date of Patent: *Aug. 25, 2015

(54) REINFORCING SHEET FOR RESIN MOLDED ARTICLE, REINFORCED STRUCTURE OF RESIN MOLDED ARTICLE, AND REINFORCING METHOD

(71) Applicant: NITTO DENKO CORPORATION, Osaka (JP)

(72) Inventors: Takuya Mase, Osaka (JP); Takahiro Fujii, Osaka (JP); Asuka Gomi, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/149,510

(22) Filed: Jan. 7, 2014

(65) Prior Publication Data

US 2014/0120343 A1 May 1, 2014

Related U.S. Application Data

(62) Division of application No. 13/635,878, filed as application No. PCT/JP2011/056116 on Mar. 15, 2011, now abandoned.

(30) Foreign Application Priority Data

Mar. 18, 2010 (JP) ................................. 2010-062029
Mar. 9, 2011 (JP) ................................. 2011-051462

(51) Int. Cl.
*B32B 7/12* (2006.01)
*B32B 27/08* (2006.01)
(Continued)

(52) U.S. Cl.
CPC ............ *B32B 37/06* (2013.01); *B32B 5/022* (2013.01); *B32B 7/12* (2013.01); *B32B 17/04* (2013.01);
(Continued)

(58) Field of Classification Search
None
See application file for complete search history.

(56) References Cited

U.S. PATENT DOCUMENTS 4,578,302 A 3/1986 Schmidt, Jr. et al.
6,096,435 A 8/2000 Maekawa et al.
(Continued)

FOREIGN PATENT DOCUMENTS

CN 102149538 A 8/2011
EP 1493558 A1 1/2005
(Continued)

OTHER PUBLICATIONS

Office Action issued by SIPO on Mar. 26, 2014 in connection with corresponding Chinese Patent Application No. 201180014228.0.
(Continued)

*Primary Examiner* — Monique Jackson
(74) *Attorney, Agent, or Firm* — Jean C. Edwards, Esq.; Edwards Neils PLLC

(57) ABSTRACT

A reinforcing sheet for a resin molded article includes a constraining layer and a reinforcing layer laminated on the constraining layer to be then heated at 80° C. or more to bring the reinforcing sheet into close contact with the resin molded article. The constraining layer may be formed from at least one of a glass cloth, a resin impregnated glass cloth, a nonwoven fabric, a metal foil, a carbon fiber or a polyester film. The reinforcing layer is formed of an adhesive composition containing styrene-ethylene-butylene-styrene copolymer or styrene-ethylene-propylene-styrene copolymer, a tackifier and a filler. When the reinforcing sheet is attached to a polypropylene plate having a thickness of 2.0 mm and is heated at 80° C. for 10 minutes, the bending strength at a displacement of 1 mm of the resulting sheet after the heating is 3N or more and the maximum bending strength thereof is 30N or more, and a high-temperature adhesion retention ratio R is 80% or more, wherein R=(Adhesive force $A_{1000h}$ after heating at 100° C. for 1000 hours/Adhesive force $A_{1h}$ after heating at 100° C. for 1 hour)×100.

3 Claims, 2 Drawing Sheets

(51) Int. Cl.
    B32B 37/06   (2006.01)
    B32B 5/02    (2006.01)
    B32B 17/04   (2006.01)
    C09J 153/02  (2006.01)
    B32B 27/04   (2006.01)
    B32B 27/12   (2006.01)
    B32B 27/32   (2006.01)
    B32B 27/38   (2006.01)

(52) U.S. Cl.
    CPC ............ B32B 27/04 (2013.01); B32B 27/08 (2013.01); B32B 27/12 (2013.01); B32B 27/32 (2013.01); B32B 27/38 (2013.01); C09J 153/025 (2013.01); B32B 2260/046 (2013.01); B32B 2262/101 (2013.01); B32B 2307/546 (2013.01); Y10T 428/266 (2015.01)

(56)           References Cited

U.S. PATENT DOCUMENTS

| | | | |
|---|---|---|---|
| 6,808,587 | B2 | 10/2004 | Bohm et al. |
| 2005/0025955 | A1 | 2/2005 | Kuriu et al. |
| 2006/0155025 | A1 | 7/2006 | Arai et al. |
| 2007/0110978 | A1 | 5/2007 | Kawaguchi et al. |
| 2009/0091878 | A1* | 4/2009 | Kawaguchi et al. ..... 361/679.01 |
| 2011/0031757 | A1 | 2/2011 | Mitsuoka et al. |
| 2011/0143125 | A1 | 6/2011 | Fujii et al. |

FOREIGN PATENT DOCUMENTS

| | | |
|---|---|---|
| EP | 2012295 A1 | 1/2009 |
| EP | 2340931 A1 | 7/2011 |
| JP | 06-171001 A | 6/1994 |
| JP | 2002-201300 A | 7/2002 |
| JP | 2002-249738 A | 9/2002 |
| JP | 2002-249738 A | 9/2002 |
| JP | 2004-115040 A | 4/2004 |
| JP | 2004-115040 A | 4/2004 |
| JP | 2005-041210 A | 2/2005 |
| JP | 2007-160895 A | 6/2007 |
| JP | 2007-160895 A | 6/2007 |
| JP | 2008-247028 A | 10/2008 |
| JP | 2009-039909 A | 2/2009 |
| WO | WO 2007125815 A1 * | 11/2007 |

OTHER PUBLICATIONS

Non-Final Office Action issued by U.S. Patent and Trademark Office on Jun. 12, 2014 in connection with related U.S. Appl. No. 14/149,517.

Communication issued by the European Patent Office, on Apr. 16, 2014 in connection with European Patent Application No. 11756324.7.

Final Office Action issued by USPTO on Feb. 5, 2014, in connection with parent U.S. Appl. No. 13/635,878.

Final Office Action issued by U.S. Patent and Trademark Office on Dec. 23, 2014 in connection with related U.S. Appl. No. 14/149,517.

Office Action issued by SIPO on Oct. 29, 2014 in connection with the Chinese Patent Application No. 201180014228.0.

Notification of Reasons for Refusal issued by the Japanese Patent Office on Sep. 24, 2014 in connection with the Japanese Patent Application No. 2011-051462.

Office Action issued by SIPO on Feb. 25, 2015 in connection with corresponding Chinese Patent Application No. 201180014228.0.

* cited by examiner

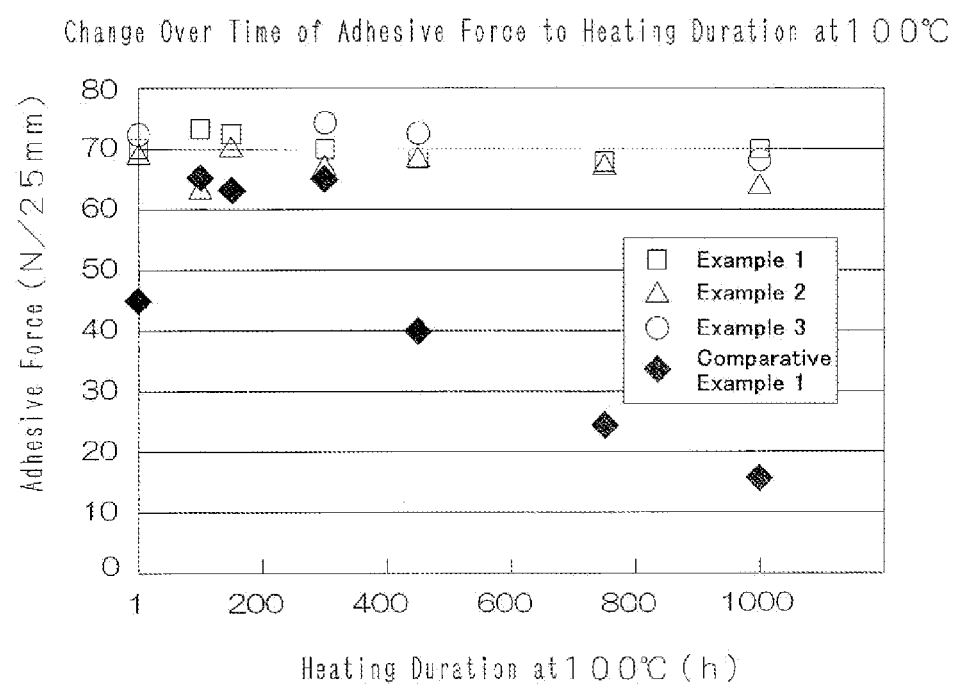

REINFORCING SHEET FOR RESIN MOLDED ARTICLE, REINFORCED STRUCTURE OF RESIN MOLDED ARTICLE, AND REINFORCING METHOD

CROSS-REFERENCE TO RELATED APPLICATIONS

This patent application is a divisional patent application of U.S. patent application Ser. No. 13/635,878 filed Sep. 18, 2012, which is a 35 U.S.C. 371 National Stage Entry of PCT/JP2011/056116, filed Mar. 15, 2011, which claims priority from Japanese Patent Application Nos. 2010-062029, filed on Mar. 18, 2010, and 2011-051462, filed on Mar. 9, 2011, the contents of all of which are herein incorporated by reference in their entirety.

TECHNICAL FIELD

The present invention relates to a reinforcing sheet for a resin molded article, a reinforced structure of a resin molded article, and a reinforcing method, to be specific, to a reinforcing sheet for a resin molded article, a reinforced structure of a resin molded article using the reinforcing sheet for a resin molded article, and a reinforcing method of the resin molded article.

BACKGROUND ART

Conventionally, a resin plate or a steel plate used in various industrial products has been processed into a thin plate shape so as to reduce the weight of the product.

Therefore, for example, it has been known that a rib is provided at the inside of the resin plate so as to reinforce the resin plate in a thin plate shape.

Also, for example, it has been known that a reinforcing sheet for a steel plate is provided at the inside of the steel plate so as to reinforce the steel plate in a thin plate shape.

For example, it has been proposed that a reinforcing sheet for a steel plate including a constraining layer and a reinforcing layer made of a foamable composition is attached to a body steel plate of an automobile and then, using a high temperature heat (for example, 160 to 200° C.) at the time of electrodeposition coating, the reinforcing layer is allowed to foam and cure, so that the body steel plate of the automobile is reinforced (ref: for example, the following Patent Document 1).

PRIOR ART DOCUMENT

Patent Document

Patent Document 1: Japanese Unexamined Patent Publication No. 2005-41210

SUMMARY OF THE INVENTION

Problems to be Solved by the Invention

However, there is a disadvantage that the rib is usually integrally molded with the resin plate and at the time of molding thereof, a sink mark occurs in a portion, which is reinforced by the rib, at the surface of the resin plate, so that the appearance of the resin plate is damaged.

When the reinforcement is performed using the reinforcing sheet for a steel plate described in the above-described Patent Document 1, the reinforcing layer of the reinforcing sheet for a steel plate is required to be heated at 160 to 200° C. to be cured. Therefore, there is a disadvantage that when the reinforcing sheet for a steel plate is attached to the resin plate to be heated at 160 to 200° C., the resin plate is deteriorated or melted.

A reinforcing sheet including the reinforcing sheet for a steel plate, after being attached to the resin plate or the steel plate, may be placed therewith under high temperature (high temperature to such a degree that the resin plate is not melted) atmosphere for long hours. Even in such a case, it is expected that the reduction in the reinforcement force is effectively prevented.

It is an object of the present invention to provide a reinforcing sheet for a resin molded article that is capable of easily reinforcing a resin molded article, while being light in weight and not damaging the appearance thereof and capable of preventing a deterioration or melting of the resin molded article by heating at relatively low temperature, and furthermore, is capable of effectively preventing the reduction in the reinforcement force under high temperature atmosphere after the elapse of a long period of time; a reinforced structure of the resin molded article; and a reinforcing method of the resin molded article.

Solution to the Problems

A reinforcing sheet for a resin molded article of the present invention includes a constraining layer and a reinforcing layer laminated on the constraining layer, wherein when the reinforcing sheet for a resin molded article is attached to a polypropylene plate having a thickness of 2.0 mm and is heated at 80° C. for 10 minutes, the bending strength at a displacement of 1 mm of the resulting sheet after the heating is 3 N or more and the maximum bending strength thereof is 30 N or more, and a high-temperature adhesion retention ratio R as determined by the following formula is 80% or more.

High-temperature adhesion retention ratio $R = ($Adhesive force $A_{1000h}$ after heating at 100° C. for 1000 hours/Adhesive force $A_{1h}$ after heating at 100° C. for 1 hour$) \times 100$ Adhesive force $A_{1000h}$ after heating at 100° C. for 1000 hours: the adhesive force with respect to a polypropylene plate, which is obtained by attaching the reinforcing layer to the polypropylene plate to be heated at 80° C. for 10 minutes and then heated at 100° C. for 1000 hours to be thereafter measured by a 90-degree peeling test based on JIS Z0237 (in 2000) at a peeling rate of 300 mm/min.

Adhesive force $A_{1h}$ after heating at 100° C. for 1 hour: the adhesive force with respect to a polypropylene plate, which is obtained by attaching the reinforcing layer to the polypropylene plate to be heated at 80° C. for 10 minutes and then heated at 100° C. for 1 hour to be thereafter measured by a 90-degree peeling test based on JIS Z0237 (in 2000) at a peeling rate of 300 mm/min.

In the reinforcing sheet for a resin molded article of the present invention, it is preferable that an adhesive force $A_{10m}$ with respect to a polypropylene plate, which is obtained by attaching the reinforcing layer to the polypropylene plate to be heated at 80° C. for 10 minutes to be thereafter measured by a 90-degree peeling test based on JIS Z0237 (in 2000) at a peeling rate of 300 mm/min, is 15 N/25 mm or more.

In the reinforcing sheet for a resin molded article of the present invention, it is preferable that the adhesive force $A_{1h}$ after heating at 100° C. for 1 hour is 50 N/25 mm or more.

In the reinforcing sheet for a resin molded article of the present invention, it is preferable that the storage elastic modulus of the reinforcing layer at 25° C. is 500 kPa or more and that at 80° C. is 500 kPa or less.

In the reinforcing sheet for a resin molded article of the present invention, it is preferable that an adhesive force $A_0$ at the time of normal temperature with respect to a polypropylene plate, which is measured by a 90-degree peeling test based on JIS Z0237 (in 2000) at a peeling rate of 300 mm/min, is 0.3 N/25 mm or more.

In the reinforcing sheet for a resin molded article of the present invention, it is preferable that the reinforcing layer is formed of a thermally adhesive type adhesive composition; it is preferable that the adhesive composition contains a hydrogenated polymer of a monomer containing conjugated dienes; it is preferable that the adhesive composition further contains a tackifier; it is preferable that the tackifier contains an alicyclic saturated hydrocarbon resin; it is preferable that the tackifier further contains a terpene resin; and it is preferable that the mixing ratio of the tackifier is 40 to 200 parts by weight with respect to 100 parts by weight of the hydrogenated polymer.

A reinforced structure of a resin molded article of the present invention includes a reinforcement of a resin molded article obtained by attaching a reinforcing sheet for a resin molded article including a constraining layer and a reinforcing layer laminated on the constraining layer to the resin molded article to be then heated at 80° C. or more to bring the reinforcing sheet for a resin molded article into close contact with the resin molded article, wherein when the reinforcing sheet for a resin molded article is attached to a polypropylene plate having a thickness of 2.0 mm and is heated at 80° C. for 10 minutes, the bending strength at a displacement of 1 mm of the resulting sheet after the heating is 3 N or more and the maximum bending strength thereof is 30 N or more, and a high-temperature adhesion retention ratio R as determined by the following formula is 80% or more.

High-temperature adhesion retention ratio $R$=(Adhesive force $A_{1000h}$ after heating at 100° C. for 1000 hours/Adhesive force $A_{1h}$ after heating at 100° C. for 1 hour)×100

Adhesive force $A_{1000h}$ after heating at 100° C. for 1000 hours: the adhesive force with respect to a polypropylene plate, which is obtained by attaching the reinforcing layer to the polypropylene plate to be heated at 80° C. for 10 minutes and then heated at 100° C. for 1000 hours to be thereafter measured by a 90-degree peeling test based on JIS Z0237 (in 2000) at a peeling rate of 300 mm/min.

Adhesive force $A_{1h}$ after heating at 100° C. for 1 hour: the adhesive force with respect to a polypropylene plate, which is obtained by attaching the reinforcing layer to the polypropylene plate to be heated at 80° C. for 10 minutes and then heated at 100° C. for 1 hour to be thereafter measured by a 90-degree peeling test based on JIS Z0237 (in 2000) at a peeling rate of 300 mm/min.

In the reinforced structure of the resin molded article of the present invention, it is preferable that the reinforcing sheet for a resin molded article is heated at 80° C. or more in advance and then, the reinforcing sheet for a resin molded article is attached to the resin molded article.

A reinforcing method of a resin molded article of the present invention includes the steps of attaching a reinforcing sheet for a resin molded article including a constraining layer and a reinforcing layer laminated on the constraining layer to the resin molded article and reinforcing the resin molded article by heating the reinforcing sheet for a resin molded article and/or the resin molded article at 80° C. or more to bring the reinforcing sheet for a resin molded article into close contact with the resin molded article, wherein when the reinforcing sheet for a resin molded article is attached to a polypropylene plate having a thickness of 2.0 mm and is heated at 80° C. for 10 minutes, the bending strength at a displacement of 1 mm of the resulting sheet after the heating is 3 N or more and the maximum bending strength thereof is 30 N or more, and a high-temperature adhesion retention ratio R as determined by the following formula is 80% or more.

High-temperature adhesion retention ratio $R$=(Adhesive force $A_{1000h}$ after heating at 100° C. for 1000 hours/Adhesive force $A_{1h}$ after heating at 100° C. for 1 hour)×100

Adhesive force $A_{1000h}$ after heating at 100° C. for 1000 hours: the adhesive force with respect to a polypropylene plate, which is obtained by attaching the reinforcing layer to the polypropylene plate to be heated at 80° C. for 10 minutes and then heated at 100° C. for 1000 hours to be thereafter measured by a 90-degree peeling test based on JIS Z0237 (in 2000) at a peeling rate of 300 mm/min.

Adhesive force $A_{1h}$ after heating at 100° C. for 1 hour: the adhesive force with respect to a polypropylene plate, which is obtained by attaching the reinforcing layer to the polypropylene plate to be heated at 80° C. for 10 minutes and then heated at 100° C. for 1 hour to be thereafter measured by a 90-degree peeling test based on JIS Z0237 (in 2000) at a peeling rate of 300 mm/min.

In the reinforcing method of the resin molded article of the present invention, it is preferable that in the step of attaching the reinforcing sheet for a resin molded article to the resin molded article, the reinforcing sheet for a resin molded article is heated at 80° C. or more in advance and then, the reinforcing sheet for a resin molded article is attached to the resin molded article.

Effect of the Invention

According to the reinforced structure and the reinforcing method of the resin molded article of the present invention using the reinforcing sheet for a resin molded article of the present invention, the reinforcing layer of the reinforcing sheet for a resin molded article is attached to the resin molded article to heat the resin molded article and/or the reinforcing sheet for a resin molded article at relatively low temperature, so that the constraining layer and the resin molded article can be tightly brought into close contact with each other by the reinforcing layer and the stiffness of the reinforcing sheet for a resin molded article can be improved. Therefore, the resin molded article can be surely reinforced by the reinforcing sheet for a resin molded article.

Among all, the reinforcing sheet for a resin molded article is attached to only a portion requiring to be reinforced in the resin molded article to be heated, so that the portion only can be easily reinforced.

Also, by a simple configuration of including the constraining layer and the reinforcing layer, the resin molded article can be reinforced while the thinning and lightening can be achieved.

Additionally, in the reinforcing sheet for a resin molded article of the present invention, the high-temperature adhesion retention ratio R of the reinforcing layer is within a specific range, so that after the constraining layer and the resin molded article are allowed to be in close contact with each other by the above-described heating at relatively low temperature, the adhesion between the constraining layer and the resin molded article can be excellently maintained even under high temperature atmosphere after the elapse of a long period of time or the adhesion therebetween can be improved.

Therefore, the reduction in the reinforcing properties of the reinforcing sheet for a resin molded article with respect to the resin molded article can be effectively prevented.

Figure 1:
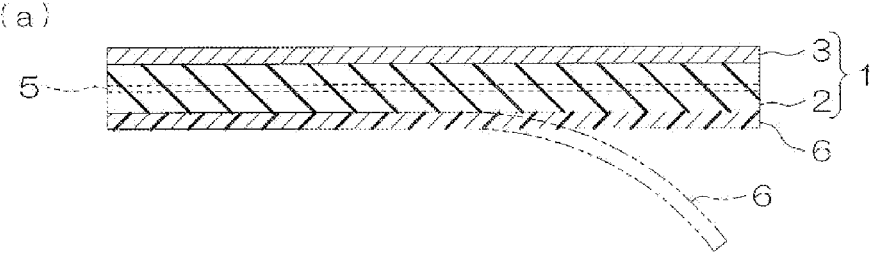
FIG. 1 shows explanatory views for illustrating one embodiment of a reinforcing method of a resin molded article of the present invention in which a resin molded article is reinforced by attaching a reinforcing sheet for a resin molded article of the present invention to the resin molded article to be heated.
Figure 1:
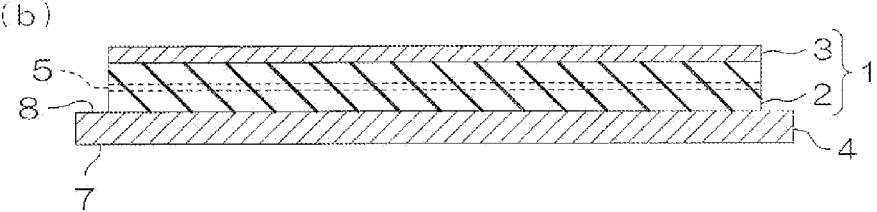

(a) illustrating a step of preparing the reinforcing sheet for a resin molded article to peel off a release film and (b) illustrating a step of attaching the reinforcing sheet for a resin molded article to the resin molded article to be heated.

FIG. 2 shows a relationship between the heating duration at 100° C. and the adhesive force in Examples 1 to 3 and Comparative Example 1.

EMBODIMENT OF THE INVENTION

A reinforcing sheet for a resin molded article of the present invention includes a constraining layer and a reinforcing layer laminated on the constraining layer.

The constraining layer is provided so as to impart toughness to the reinforcing layer after being attached and heated and is formed into a sheet shape. Preferably, the constraining layer is formed of a material which is light in weight, has a thin film, and is capable of being integrally in close contact with the reinforcing layer. To be specific, examples thereof include a glass cloth, a resin impregnated glass cloth, a non-woven fabric, a metal foil, a carbon fiber, and a polyester film.

The glass cloth is cloth formed from a glass fiber and a known glass cloth is used.

The resin impregnated glass cloth is obtained by performing an impregnation treatment of a synthetic resin such as a thermosetting resin and a thermoplastic resin into the above-described glass cloth and a known resin impregnated glass cloth is used. Examples of the thermosetting resin include an epoxy resin, a urethane resin, a melamine resin, and a phenol resin. Examples of the thermoplastic resin include a vinyl acetate resin, an ethylene-vinyl acetate copolymer (EVA), a vinyl chloride resin, and an EVA-vinyl chloride resin copolymer. The above-described thermosetting resins and thermoplastic resins can be used alone or in combination, respectively.

An example of the non-woven fabric include a non-woven fabric formed of a fiber such as a wood fiber (a wood pulp and the like); a cellulose fiber (for example, a regenerated cellulose fiber such as rayon, a semi-synthetic cellulose fiber such as acetate, a natural cellulose fiber such as hemp and cotton, or a blended yarn thereof); a polyester fiber; a polyvinyl alcohol (PVA) fiber; a polyamide fiber; a polyolefin fiber, a polyurethane fiber; and a cellulose fiber (hemp, or hemp and another cellulose fiber).

An example of the metal foil includes a known metal foil such as an aluminum foil and a steel foil.

The carbon fiber is cloth formed from a fiber mainly composed of carbon and a known carbon fiber is used.

Examples of the polyester film include a polyethylene terephthalate (PET) film, a polyethylene naphthalate (PEN) film, and a polybutylene terephthalate (PBT) film. Preferably, a PET film is used.

Of the constraining layers, in view of adhesion, strength, and cost, preferably, a resin impregnated glass cloth is used.

The thickness of the constraining layer is, for example, 0.05 to 2.0 mm, or preferably 0.1 to 1.0 mm.

The reinforcing layer is formed by molding an adhesive composition into a sheet shape.

The adhesive composition is a thermally adhesive type (thermally pressure adhesive type) and to be specific, develops adhesiveness (pressure adhesion) by, for example, heated at 80° C. or more.

The adhesive composition contains, as a main component, for example, a hydrogenated polymer of a monomer containing conjugated dienes.

Preferably, the monomer contains the conjugated dienes as essential elements and a copolymerizable monomer which is copolymerizable with the conjugated dienes as an arbitrary element.

Examples of the conjugated dienes include 1,3-butadiene, isoprene (2-methyl-1,3-butadiene), and chloroprene (2-chloro-1,3-butadiene).

As the copolymerizable monomer, a monomer having at least one double bond is used. Examples thereof include an aliphatic vinyl monomer (olefins) such as ethylene, propylene, and isobutylene (2-methylpropene); an aromatic vinyl monomer such as styrene; and a cyano group-containing vinyl monomer such as (meth)acrylonitrile.

These copolymerizable monomers can be used alone or in combination of two or more. Preferably, an aromatic vinyl monomer is used.

To be specific, examples of the monomer include a block or random copolymer of the conjugated dienes and the copolymerizable monomer. Preferably, a block copolymer is used. To be specific, a styrene-butadiene-styrene block copolymer and a styrene-isoprene-styrene block copolymer are used.

The mixing ratio of the copolymerizable monomer is, for example, 5 to 80 parts by weight, or preferably 15 to 50 parts by weight with respect to 100 parts by weight of the conjugated dienes.

That is, the mixing ratio of the copolymerizable monomer (preferably, an aromatic vinyl monomer, or more preferably, styrene) and the conjugated dienes (preferably, butadiene or isoprene) is, by weight basis, for example, 50 weight % or less/50 weight % or more (the weight ratio of the copolymerizable monomer to the conjugated dienes), or preferably 40 weight % or less/60 weight % or more, and usually is 10 weight % or more/90 weight % or less. In other words, the mixing ratio of the copolymerizable monomer is, for example, 50 weight % or less, or preferably 40 weight % or less, and usually is 10 weight % or more with respect to the total amount of the conjugated dienes and the copolymerizable monomer.

In the above-described hydrogenated polymer, an unsaturated bond (a double bond portion) derived from the conjugated dienes is completely hydrogenated or partially hydrogenated. Preferably, an unsaturated bond is completely hydrogenated. To be specific, examples of the hydrogenated polymer include a styrene-ethylene-butylene-styrene copolymer (SEBS, to be more specific, an SEBS block copolymer) and a styrene-ethylene-propylene-styrene copolymer (SEPS, to be more specific, an SEPS block copolymer).

The hydrogenated polymer does not substantially contain the unsaturated bond by the above-described hydrogenation of the polymer, so that the hydrogenated polymer is difficult to be thermally deteriorated under high temperature atmosphere and therefore, the heat resistance of the reinforcing layer can be improved.

The weight average molecular weight (GPC calibrated with polystyrene) of the hydrogenated polymer is, for example, 20000 or more, or preferably 25000 to 100000.

The melt flow rate (MFR) of the hydrogenated polymer at the temperature of 190° C. and the weight of 2.16 kg is, for example, 10 g/10 min or less, or preferably 5 g/10 min or less, and usually is 0.1 g/10 min or more.

The melt flow rate (MFR) of the hydrogenated polymer at the temperature of 200° C. and the weight of 5 kg is, for example, 50 g/10 min or less, or preferably 20 g/10 min or less, and usually is 0.1 g/10 min or less.

These hydrogenated polymers can be used alone or in combination of two or more.

Of the hydrogenated polymers, preferably, SEBS is used.

Preferably, a tackifier is further contained in the adhesive composition.

The tackifier is contained in the adhesive composition so as to improve the adhesion between the reinforcing layer, and the resin molded article and the constraining layer, or to improve the reinforcing properties at the time of reinforcement of the resin molded article.

Examples of the tackifier include a rosin resin, a terpene resin (including a terpene phenol copolymer (a terpene modified phenol resin), a hydrogenated terpene resin, and the like), a coumarone-indene resin, an alicyclic saturated hydrocarbon resin, a petroleum resin (for example, a hydrocarbon petroleum resin such as an aliphatic/aromatic copolymerizable petroleum resin and an aromatic petroleum resin), and a phenol resin.

The softening point of the tackifier is, for example, 50 to 150° C., or preferably 50 to 130° C.

The softening point of the tackifier is measured by a ring and ball test.

The glass transition point of the tackifier is, for example, 0 to 100° C., or preferably 20 to 60° C.

The glass transition point is measured by a DSC method or the like.

The weight average molecular weight of the tackifier is, for example, 100 to 10000, or preferably 200 to 2000.

The weight average molecular weight of the tackifier is determined by a GPC method using standard polystyrene (PS) having a known weight average molecular weight in calibration.

The tackifiers can be used alone or in combination of two or more.

Of the tackifiers, preferably, in view of compatibility with the hydrogenated polymer, a terpene resin and an alicyclic saturated hydrocarbon resin are used.

To be specific, as the tackifier, an alicyclic saturated hydrocarbon resin is used alone, different types (preferably, two types) of alicyclic saturated hydrocarbon resins are used in combination, or an alicyclic saturated hydrocarbon resin and a terpene resin are used in combination. Preferably, in view of improving storage elastic modulus G' of the reinforcing layer to be described later and/or in view of increasing high-temperature adhesion retention ratio R to be described later, an alicyclic saturated hydrocarbon resin and a terpene resin are used in combination.

The mixing ratio of the tackifier is, for example, 40 to 200 parts by weight, or preferably 50 to 170 parts by weight with respect to 100 parts by weight of the hydrogenated polymer.

When the mixing ratio of the tackifier is below the above-described range, the adhesion between the reinforcing layer, and the resin molded article and the constraining layer may not be sufficiently improved or the reinforcing properties at the time of reinforcement of the resin molded article may not be sufficiently improved.

On the other hand, when the mixing ratio of the tackifier exceeds the above-described range, the reinforcing layer may become fragile.

When two different types of alicyclic saturated hydrocarbon resins are used in combination, the ratio of one alicyclic saturated hydrocarbon resin to the other alicyclic saturated hydrocarbon resin is, by weight ratio (the number of parts by weight of one alicyclic saturated hydrocarbon resin/the number of parts by weight of the other alicyclic saturated hydrocarbon resin), for example, 10/90 to 50/50, or preferably 20/80 to 40/60.

When an alicyclic saturated hydrocarbon resin and a terpene resin are used in combination, the ratio of the terpene resin to the alicyclic saturated hydrocarbon resin is, by weight ratio (the number of parts by weight of the terpene resin/the number of parts by weight of the alicyclic saturated hydrocarbon resin), for example, 1/99 to 80/20, or preferably 5/95 to 60/40.

Other than the above-described components, an additive can be also added to the adhesive composition at an appropriate proportion. Examples of the additive include fillers, oxidation inhibitors, softeners (for example, naphthenic oil, paraffinic oil, and the like), thixotropic agents (for example, montmorillonite and the like), lubricants (for example, stearic acid and the like), pigments, antiscorching agents, stabilizers, antioxidants, ultraviolet absorbers, colorants, fungicides, and flame retardants.

Examples of the filler include magnesium oxide, calcium carbonate (for example, heavy calcium carbonate, light calcium carbonate, Hakuenka, and the like), magnesium silicate (for example, talc and the like), mica, clay, mica powder, bentonite (for example, organic bentonite and the like), silica, alumina, aluminum hydroxide, aluminum silicate, titanium oxide, carbon black (for example, insulating carbon black, acetylene black, and the like), aluminum powder, and glass balloon. The fillers can be used alone or in combination of two or more. Among all, by using a hollow filler having a low specific gravity such as glass balloon, the lightening of the reinforcing layer can be achieved without using a foaming agent. Preferably, calcium carbonate is used.

Examples of the oxidation inhibitors include amine-ketones, aromatic secondary amines, phenols, benzimidazoles (for example, 2-mercaptobenzimidazole and the like), thioureas, and phosphorous acids. The oxidation inhibitors can be used alone or in combination of two or more. Preferably, benzimidazoles are used.

The addition ratio of the additive, among all, that of the filler is, for example, 1 to 200 parts by weight and that of the oxidation inhibitor is, for example, 0.1 to 5 parts by weight with respect to 100 parts by weight of the polymer.

The adhesive composition can be prepared by blending the above-described components at the above-described mixing proportion. Furthermore, in order to form the reinforcing layer to be laminated on the constraining layer, a method (a direct forming method) is used in which the above-described components are dissolved or dispersed in a known solvent (for example, toluene and the like) or water at the above-described mixing proportion to prepare a solution or a dispersion liquid and thereafter, the obtained solution or dispersion liquid are applied to the top surface of the constraining layer to be then dried.

Alternatively, another method (a transfer method) is used in which the obtained solution or dispersion liquid are applied to the top surface of a release film to be described later to be then dried, so that the reinforcing layer is formed to be thereafter transferred to the top surface of the constraining layer.

Also, in order to form the reinforcing layer by preparing the adhesive composition to be laminated on the constraining layer, a method (a direct forming method) is used in which the above-described components (excluding the above-described solvent and water) are directly kneaded with, for example, a mixing roll, a pressurized kneader, an extruder, or the like to prepare a kneaded product and then, the obtained kneaded product is molded into a sheet shape by, for example, a calendar molding, an extrusion molding, a press molding, or the like to form the reinforcing layer to be laminated on the top surface of the constraining layer. To be specific, the kneaded product is disposed between the constraining layer and the release film (described later) to be sandwiched and thereafter, they are extended by applying pressure into a sheet shape by, for example, the press molding. Alternatively, another method (a transfer method) is used in which the formed reinforcing layer is laminated on the top surface of the release film to be thereafter transferred to the top surface of the constraining layer.

The thickness of the reinforcing layer formed in this manner is, for example, 0.02 to 3.0 mm, or preferably 0.03 to 1.3 mm. The thickness of the reinforcing layer can be also set to be, for example, 0.2 to 1.0 mm, or preferably 0.5 to 0.9 mm.

The storage elastic modulus (G') at 25° C. of the reinforcing layer formed as described above in the present invention is, for example, 500 kPa or more, or preferably 1500 kPa or more, and usually is 200000 kPa or less, or preferably 20000 kPa or less.

When the storage elastic modulus at 25° C. is below the above-described range, the reinforcing properties may not be sufficiently improved.

The storage elastic modulus (G') of the reinforcing layer measured at 80° C. is, for example, 1000 kPa or less, or preferably 500 kPa or less, and usually is 100 kPa or more.

When the storage elastic modulus at 80° C. is not within the above-described range, the resin molded article and the reinforcing layer may not be tightly in close contact with each other.

The storage elastic modulus (G') at 25° C. and 80° C. is, though described in details in Examples, measured with a dynamic viscoelasticity measuring apparatus (measuring conditions: an initial strain of 0.1%, a temperature rising speed of 5° C./min, a frequency of 1 Hz).

The thickness of the reinforcing sheet for a resin molded article obtained in this manner is, for example, 0.25 to 5.0 mm, or preferably 0.4 to 2.3 mm. The thickness of the reinforcing sheet for a resin molded article can be also set to be, for example, 0.3 to 3 mm, or preferably 0.3 to 1.3 mm.

When the thickness of the reinforcing sheet for a resin molded article exceeds the above-described range, the lightening of the reinforcing sheet for a resin molded article may become difficult and the production cost may be increased. When the thickness of the reinforcing sheet for a resin molded article is below the above-described range, the reinforcing properties may not be sufficiently improved.

In the obtained reinforcing sheet for a resin molded article, the release film (a separator) can be attached to the top surface (the top surface which is the opposite side with respect to the back surface on which the constraining layer is laminated) of the reinforcing layer as required until it is actually used.

An example of the release film includes a known release film such as a synthetic resin film including a polyethylene film, a polypropylene film, and a PET film.

When the reinforcing sheet for a resin molded article (and the reinforcing layer thereof) formed in this manner is attached to a polypropylene plate having a thickness of 2.0 mm and is heated at 80° C. for 10 minutes, the bending strength at a displacement of 1 mm of the resulting sheet after the heating is 3 N or more, preferably 3.5 N or more, or more preferably 4 N or more, and usually is 20 N or less, or preferably 10 N or less and the maximum bending strength thereof is 30 N or more, preferably 35 N or more, or more preferably 40 N or more, and usually is 200 N or less, or preferably 100 N or less.

The bending strength at a displacement of 1 mm and the maximum bending strength described above are measured by a three point bending test. In the test, a polypropylene plate having a thickness of 2.0 mm reinforced by the reinforcing sheet for a resin molded article is trimmed into a size of a length of 150 mm×a width of 25 mm to obtain a test piece. Thereafter, the test piece is pressed from the polypropylene plate side with a distance between supporting points of 100 mm at a speed of 50 mm/min at the center (the lengthwise center and the widthwise center) of the test piece with an indenter having a diameter of 10 mm using a universal testing machine.

In the attachment of the reinforcing sheet for a resin molded article to the polypropylene plate, the reinforcing layer is brought into contact with the polypropylene plate.

The bending strength at a displacement of 1 mm is a bending strength (strength) at the time of displacement of the indenter by 1 mm from the start of the pressing. The maximum bending strength is a maximum bending strength (strength) during the time between the start of the pressing and the fracture of the test piece.

When the bending strength at a displacement of 1 mm and the maximum bending strength are within the above-described range, the resin molded article can be sufficiently reinforced.

In the reinforcing sheet for a resin molded article, an adhesive force $A_0$ with respect to the polypropylene plate, which is obtained by attaching the reinforcing layer to the polypropylene plate at normal temperature (25° C.) to be thereafter measured by a 90-degree peeling test at a peeling rate of 300 mm/min, is, for example, 0.3 N/25 mm or more, preferably 1.0 N/25 mm or more, furthermore 3.0 N/25 mm or more, furthermore 5.0 N/25 mm or more, furthermore 10 N/25 mm or more, furthermore 15 N/25 mm or more, or furthermore 20 N/25 mm or more, and usually is 40 N/25 mm or less, or preferably 30 N/25 mm or less.

The above-described adhesive force $A_0$ is defined as an adhesive force $A_0$ at the time of normal temperature.

The adhesive force $A_0$ at the time of normal temperature is measured in conformity with JIS Z0237 (in 2000).

When the adhesive force $A_0$ at the time of normal temperature of the reinforcing sheet for a resin molded article is within the above-described range, the reinforcing layer shows a slight adhesion (a slight tackiness), so that the reinforcing sheet for a resin molded article can be surely attached to the resin molded article at the time of normal temperature before heating.

In the reinforcing sheet for a resin molded article, an adhesive force $A_{10m}$ with respect to the polypropylene plate, which is obtained by attaching the reinforcing layer to the polypropylene plate at normal temperature to be heated at 80° C. for 10 minutes to be thereafter measured by a 90-degree peeling test at a peeling rate of 300 mm/min, is, for example, 15 N/25 mm or more, preferably 20 N/25 mm or more, more preferably 25 N/25 mm or more, furthermore 30 N/25 mm or more, or furthermore 40 N/25 mm or more, and usually is 200 N/25 mm or less, or preferably 100 N/25 mm or less.

The above-described adhesive force $A_{10m}$ is defined as an adhesive force $A_{10m}$ after heating at 80° C.

The adhesive force $A_{10m}$ after heating at 80° C. is measured in conformity with JIS Z0237 (in 2000).

When the adhesive force $A_{10m}$ after heating at 80° C. is within the above-described range, by heating at relatively low temperature (80° C.), the constraining layer and the resin molded article can be further tightly brought into close contact with each other by the reinforcing layer.

In addition, in the reinforcing sheet for a resin molded article, an adhesive force after heating at high temperature, to be specific, at 100° C., to be more specific, an adhesive force $A_{1h}$ with respect to the polypropylene plate, which is obtained by first attaching the reinforcing layer to the polypropylene plate at normal temperature (25° C.) to be heated at 80° C. for 10 minutes and then heated at 100° C. for 1 hour to be thereafter measured by a 90-degree peeling test at a peeling rate of 300 mm/min, is, for example, 50 N/25 mm or more, preferably 60 N/25 mm or more, more preferably 65 N/25 mm or more, furthermore 70 N/25 mm or more, furthermore 75 N/25 mm or more, or furthermore 80 N/25 mm or more, and usually is 300 N/25 mm or less, or preferably 200 N/25 mm or less.

The above-described adhesive force $A_{1h}$ is defined as an adhesive force $A_{1h}$ after heating at 100° C. for 1 hour.

The above-described adhesive force $A_{1h}$ after heating at 100° C. for 1 hour is measured in conformity with JIS Z0237 (in 2000).

When the adhesive force $A_{1h}$ after heating at 100° C. for 1 hour is within the above-described range, the initial adhesive force can be maintained high under high temperature atmosphere and the excellent initial reinforcing properties under high temperature atmosphere can be ensured.

In the reinforcing sheet for a resin molded article, an adhesive force $A_{1000h}$ with respect to the polypropylene plate, which is obtained by first attaching the reinforcing layer to the polypropylene plate at normal temperature (25° C.) to be heated at 80° C. for 10 minutes and then heated at 100° C. for 1000 hours to be thereafter measured by a 90-degree peeling test at a peeling rate of 300 mm/min, is, for example, 45 N/25 mm or more, preferably 55 N/25 mm or more, more preferably 60 N/25 mm or more, furthermore 70 N/25 mm or more, furthermore 80 N/25 mm or more, furthermore 90 N/25 mm or more, or furthermore 100 N/25 mm or more, and usually is 250 N/25 mm or less, preferably 200 N/25 mm or less, or more preferably 125 N/25 mm or less.

The above-described adhesive force $A_{1000h}$ is defined as an adhesive force $A_{1000h}$ after heating at 100° C. for 1000 hours.

The above-described adhesive force $A_{1000h}$ after heating at 100° C. for 1000 hours is measured in conformity with JIS Z0237 (in 2000).

When the adhesive force $A_{1000h}$ after heating at 100° C. for 1000 hours is within the above-described range, the reduction in the adhesive force after the elapse of a long period of time can be prevented under high temperature atmosphere and the reduction in the reinforcing properties after the elapse of a long period of time can be prevented under high temperature atmosphere.

That is, in the reinforcing sheet for a resin molded article, the ratio of the adhesive force $A_{1000h}$ to the adhesive force $A_{1h}$, that is, the high-temperature (100° C.) adhesion retention ratio R ((the adhesive force $A_{1000h}$/the adhesive force $A_{1h}$)×100) is 80% or more, preferably 85% or more, more preferably 90% or more, furthermore 100% or more, furthermore 110% or more, furthermore 120% or more, furthermore 135% or more, or furthermore 150% or more, and usually is 500% or less.

Each of the adhesive forces of the reinforcing sheet for a resin molded article described above is substantially the same as each of the corresponding adhesive forces of the reinforcing layer.

The reinforcing sheet for a resin molded article of the present invention is used in the reinforcement of the resin molded article.

The resin molded article is not particularly limited as long as it is a resin molded article requiring reinforcement. An example thereof includes a resin molded article used in various industrial products. An example of a resin for forming the resin molded article includes a resin having a low polarity such as an olefin resin.

Examples of the olefin resin include polypropylene and polyethylene. Preferably, polypropylene is used.

To be specific, examples of the resin molded article include a bumper and an instrument panel of an automobile.

FIG. 1 shows explanatory views for illustrating one embodiment of a reinforcing method of a resin molded article of the present invention in which a resin molded article is reinforced by attaching a reinforcing sheet for a resin molded article of the present invention to the resin molded article to be heated: (a) illustrating a step of preparing the reinforcing sheet for a resin molded article to peel off a release film and (b) illustrating a step of attaching the reinforcing sheet for a resin molded article to the resin molded article to be heated.

Next, one embodiment of the reinforced structure and the reinforcing method of the resin molded article of the present invention in which the resin molded article is reinforced by attaching the reinforcing sheet for a resin molded article of the present invention to the resin molded article to be heated is described with reference to FIG. 1.

As shown in FIG. 1 (a), in a reinforcing sheet 1 for a resin molded article, a reinforcing layer 2 is laminated on a constraining layer 3 and a release film 6 is attached to the top surface (the top surface which is the opposite side with respect to the back surface on which the constraining layer 3 is laminated) of the reinforcing layer 2 as required.

As shown in FIG. 1 (b), a resin molded article 4 is used in the above-described various industrial products. The resin molded article 4 is, for example, formed into a plate shape and to be more specific, is formed so as to include an outer surface 7 that appears in the appearance and an inner surface 8 that faces inwardly and does not show in the appearance.

As shown by phantom lines in FIG. 1 (a), in order to attach the reinforcing sheet 1 for a resin molded article to the resin molded article 4, first, the release film 6 is peeled off from the top surface of the reinforcing layer 2. Next, as shown in FIG. 1 (b), the top surface of the reinforcing layer 2 is brought into contact with the inner surface 8 of the resin molded article 4 and is compressively bonded thereto as required. In the compression bonding of the reinforcing sheet 1 for a resin molded article, a pressure is applied at a pressure of about, for example, 0.15 to 10 MPa.

In addition, heating (thermal compression bonding) can be also performed with pressurization as required. That is, the reinforcing sheet 1 for a resin molded article is heated in advance and then, the heated reinforcing sheet 1 for a resin molded article is attached to the resin molded article 4.

Conditions for the thermal compression bonding are as follows: a temperature of, for example, 80° C. or more, preferably 90° C. or more, or more preferably 100° C. or more, and usually is the heat resistance temperature of the resin molded article 4 or less, to be specific, for example, 130° C. or less, preferably 30 to 120° C., or more preferably 80 to 110° C.

Thereafter, the resin molded article 4 to which the reinforcing sheet 1 for a resin molded article is attached is heated.

The heating temperature is 80° C. or more, preferably 90° C. or more, or more preferably 100° C. or more, and usually is the heat resistance temperature of the resin molded article 4 or less, to be specific, for example, 130° C. or less, preferably 30 to 120° C., or more preferably 80 to 110° C. The heating duration is, for example, 0.5 to 20 minutes, or preferably 1 to 10 minutes.

When the heating temperature and the heating duration are below the above-described range, there may be a case where the resin molded article 4 and the constraining layer 3 cannot be sufficiently brought into close contact with each other or the reinforcing properties at the time of reinforcement of the resin molded article 4 cannot be sufficiently improved. When the heating temperature and the heating duration exceed the above-described range, the resin molded article 4 may be deteriorated or melted.

The above-described heating of the resin molded article 4 is performed by putting the resin molded article 4 to which the reinforcing sheet 1 for a resin molded article into a drying oven in a drying process of production of the resin molded article 4.

Alternatively, when the drying process is not performed in the production of the resin molded article 4, only the reinforcing sheet 1 for a resin molded article is heated by using a partial heating device such as a heat gun instead of the above-described input into the drying oven.

Alternatively, using the above-described heating device, only the resin molded article 4, or furthermore, both of the reinforcing sheet 1 for a resin molded article and the resin molded article 4 can be heated. When only the resin molded article 4 is heated, heat of the heating device is conducted (thermal conducted) to the reinforcing sheet 1 for a resin molded article via the resin molded article 4.

Then, the reinforcing sheet 1 for a resin molded article is attached to the resin molded article 4 to heat the reinforcing sheet 1 for a resin molded article and/or the resin molded article 4, so that the reinforcing sheet 1 for a resin molded article is brought into close contact with the resin molded article 4 to form the reinforced structure of the resin molded article 4 reinforced with the reinforcing sheet 1 for a resin molded article.

In the reinforced structure and the reinforcing method of the resin molded article 4, by the above-described heating at relatively low temperature, the constraining layer 3 and the resin molded article 4 can be tightly brought into close contact with each other by the reinforcing layer 2. At the same time with this, the stiffness of the reinforcing sheet 1 for a resin molded article can be improved. Therefore, the resin molded article 4 can be surely reinforced by the reinforcing sheet 1 for a resin molded article.

Among all, the reinforcing sheet 1 for a resin molded article is attached to only a portion requiring to be reinforced in the resin molded article 4 to be heated, so that the portion only can be easily reinforced. Therefore, the increase in the production cost can be prevented.

Also, the reinforcing sheet 1 for a resin molded article has a simple configuration of including the constraining layer 3 and the reinforcing layer 2, so that the resin molded article 4 can be reinforced while the thinning and lightening can be achieved.

Additionally, in the reinforcing sheet 1 for a resin molded article, the high-temperature adhesion retention ratio R of the reinforcing layer 2 is within a specific range, so that after the constraining layer 3 and the resin molded article 4 are allowed to be in close contact with each other by the above-described heating at relatively low temperature, the adhesion between the constraining layer 3 and the resin molded article 4 can be excellently maintained even under high temperature (high temperature which is the heat resistance temperature of the resin molded article 4 or less) atmosphere after the elapse of a long period of time or the adhesion therebetween can be improved.

Therefore, the reduction in the reinforcing properties of the reinforcing sheet 1 for a resin molded article with respect to the resin molded article 4 can be effectively prevented.

In the above-described description, the reinforcing layer 2 is formed only of one piece of a sheet made of an adhesive composition. Alternatively, for example, as shown by dashed lines in FIG. 1, a non-woven fabric 5 can be also interposed partway in the thickness direction of the reinforcing layer 2.

An example of the non-woven fabric 5 includes the same non-woven fabric as that in the description above. The thickness of the non-woven fabric 5 is, for example, 0.01 to 0.3 mm.

In order to produce the reinforcing sheet 1 for a resin molded article, for example, in the direct forming method, a first reinforcing layer is laminated on the top surface of the constraining layer 3 and the non-woven fabric 5 is laminated on the top surface (the top surface which is the opposite side with respect to the back surface on which the constraining layer 3 is laminated) of the first reinforcing layer. Thereafter, a second reinforcing layer is laminated on the top surface (the top surface which is the opposite side with respect to the back surface on which the first reinforcing layer is laminated) of the non-woven fabric 5.

In the transfer method, the non-woven fabric 5 is tucked in from both sides of the top surface side and the back surface side of the non-woven fabric 5 by the first reinforcing layer and the second reinforcing layer. To be specific, first, the first reinforcing layer and the second reinforcing layer are respectively formed on the top surfaces of two pieces of the release films 6 and then, the first reinforcing layer is transferred to the back surface of the non-woven fabric 5 and the second reinforcing layer is transferred to the top surface of the non-woven fabric 5.

By interposing the non-woven fabric 5, the reinforcing layer 2 can be easily formed with a thick thickness according to the strength of the resin molded article 4 which is required to be reinforced.

EXAMPLES

The present invention will now be described in more detail by way of Examples and Comparative Examples. However, the present invention is not limited to the following Examples and Comparative Examples.

Examples 1 to 10 and Comparative Example 1

In accordance with the mixing formulation shown in Table 1, components each were blended by parts by weight basis to be kneaded with a mixing roll heated at 120° C. in advance, so that a kneaded product of an adhesive composition was prepared.

Next, the prepared kneaded product of the adhesive composition was sandwiched between a resin impregnated glass cloth (a constraining layer) having a thickness of 0.18 mm in which an epoxy resin was impregnated and a release film. The kneaded product was extended by applying pressure into a sheet shape by a press molding at 120° C. to produce a reinforcing sheet for a resin molded article having a thickness of 0.8 mm (ref: FIG. 1 (a)). The thickness of the reinforcing layer was 0.62 mm.

Comparative Example 2

5 parts by weight of dicyandiamide (DCDA, a curing agent), 2 parts by weight of an imidazole compound (2MAOK, a curing agent, manufactured by SHIKOKU CHEMICALS CORPORATION), 100 parts by weight of talc (trade name "Imported Talc", magnesium silicate, manufactured by SOBUE CLAY Co., Ltd.), 10 parts by weight of organite (organic bentonite, manufactured by HOJUN), and 0.5 parts by weight of carbon black (Asahi #50, insulating carbon black, manufactured by ASAHI CARBON CO., LTD.) were blended with respect to 100 parts by weight of a bisphenol A epoxy resin (#834, manufactured by Japan Epoxy Resins Co., Ltd.) to be kneaded with a mixing roll heated at 80° C. in advance, so that a kneaded product of an adhesive composition was prepared.

Next, the prepared kneaded product of the adhesive composition was press molded to form a reinforcing layer having a thickness of 0.30 mm.

Thereafter, the reinforcing layer was laminated on the top surface of a resin impregnated glass cloth having a thickness of 0.18 mm in which an epoxy resin was impregnated, so that a reinforcing sheet for a resin molded article having a thickness of 0.48 mm was produced.

(Evaluation)

The bending strength, the storage elastic modulus, and the adhesive force of the reinforcing sheets for resin molded articles obtained in Examples and Comparative Examples were evaluated as follows. The results are shown in Table 1.

1) Bending Strength of Reinforcing Sheet for Resin Molded Article

The reinforcing sheets for resin molded articles of Examples and Comparative Examples were attached to polypropylene plates each having a thickness of 2.0 mm to be heated at 80° C. for 10 minutes. Thereafter, the bending strength at a displacement of 1 mm and the maximum bending strength of the obtained pieces were measured by a three point bending test.

In the three point bending test, the reinforcing sheet for a resin molded article was attached to the polypropylene plate having a thickness of 2.0 mm to obtain a test piece. Thereafter, the test piece was pressed from the polypropylene plate side with a distance between supporting points of 100 mm at a speed of 50 mm/min at the center (the lengthwise center and the widthwise center) of the test piece with an indenter having a diameter of 10 mm using a universal testing machine (manufactured by Minebea Co., Ltd.).

In the attachment of the reinforcing sheet for a resin molded article to the polypropylene plate, the reinforcing layer was brought into contact with the polypropylene plate.

As shown in Table 1, in the reinforcing sheets for resin molded articles of Examples 1 to 10 and Comparative Example 1, the bending strength at a displacement of 1 mm and the maximum bending strength were high, which were 3 N or more and 30 N or more, respectively.

On the other hand, it was found that in the reinforcing sheet for a resin molded article of Comparative Example 2, the bending strength at a displacement of 1 mm and the maximum bending strength were low, which were below 3 N and below 30 N, respectively.

2) Storage Elastic Modulus (G') of Reinforcing Layer

The storage elastic modulus (G') at 25° C. and that at 80° C. of only the reinforcing layers formed in Examples 1 to 3 and Comparative Examples 1 and 2 were measured with a dynamic viscoelasticity measuring apparatus.

The storage elastic modulus (G') at 25° C. of only the reinforcing layers formed in Examples 4 to 10 was measured with a dynamic viscoelasticity measuring apparatus.

Measuring conditions are shown in the following.

Dynamic Viscoelasticity Measuring Apparatus: manufactured by ARES Corporation and Rheometric Scientific Jig for Use: parallel plate sample thickness of about 1.0 mm diameter of 7.9 mm Measuring Conditions: initial strain of 0.1% temperature rising speed of 5° C./min frequency of 1 Hz

3) Adhesive Force of Reinforcing Layer (Adhesive Force $A_0$ at Time of Normal Temperature, Adhesive Force $A_{10m}$ After Heating at 80° C., Adhesive Force $A_{xh}$ After Heating at 100° C.)

The adhesive forces to be described next with respect to polypropylene plates of only the reinforcing layers formed in Examples and Comparative Examples were measured by a 90-degree peeling test based on JIS Z0237 (in 2000) at a peeling rate of 300 mm/min.

(i) Adhesive Force $A_0$ at Time of Normal Temperature

First, only the reinforcing layers of Examples and Comparative Examples were attached to polypropylene plates at normal temperature (25° C.) and then, the adhesive force (the adhesive force at the time of normal temperature) $A_0$ with respect to the polypropylene plate was measured.

(ii) Adhesive Force $A_{10m}$ After Heating at 80° C.

First, only the reinforcing layers of Examples and Comparative Examples were attached to polypropylene plates at normal temperature (25° C.) to be then heated at 80° C. for 10 minutes. Thereafter, the adhesive force (the adhesive force after heating at 80° C. for 10 minutes) $A_{10m}$ with respect to the polypropylene plate was measured.

(iii) Adhesive Force After Heating at 100° C.

First, only the reinforcing layers of Examples 1 to 10 and Comparative Example 1 were attached to polypropylene plates at normal temperature (25° C.) to be then heated at 80° C. for 10 minutes and then heated at 100° C. for 1 hour. Thereafter, the adhesive force (the adhesive force after heating at 100° C. for 1 hour) $A_{1h}$ with respect to the polypropylene plate was measured.

The above-described heating duration at 100° C. was changed respectively to 95 hours (only Examples 1 and 2, and Comparative Example 1), 166 hours (only Examples 1 and 2, and Comparative Example 1), 287 hours (only Examples 1 to 3, and Comparative Example 1), 475 hours (only Examples 1 to 3, and Comparative Example 1), 744 hours (only Examples 1 and 2, and Comparative Example 1), and 1000 hours (Examples 1 to 10 and Comparative Example 1) to measure an adhesive force $A_{95h}$, an adhesive force $A_{166h}$, an adhesive force $A_{287h}$, an adhesive force $A_{475h}$, an adhesive force $A_{744h}$, and an adhesive force $A_{1000h}$, respectively.

In Examples 1 to 3 and Comparative Example 1, the relationship between the heating duration at 100° C. and the adhesive force (the adhesive force $A_{xh}$ after heating at high temperature) described above is shown in FIG. 2.

As shown in FIG. 2, in the reinforcing sheet for a resin molded article of Comparative Example 1, the adhesive force $A_{xh}$ after heating at high temperature is significantly reduced according to the elapse of the heating duration. After heating for 1000 hours, the adhesive force $A_{xh}$ after heating at high temperature is below 45 N/25 mm and the high-temperature adhesion retention ratio R is below 80%.

On the other hand, in the reinforcing sheets for resin molded articles of Examples 1 to 3, the adhesive force $A_{xh}$ after heating at high temperature is not substantially reduced according to the elapse of the heating duration. As shown in Table 1, in the reinforcing sheets for resin molded articles of Examples 1 to 10, after heating for 1000 hours, each of the adhesive forces $A_{xh}$ after heating at high temperature is 45 N/25 mm or more and each of the high-temperature adhesion retention ratios R is high, which is 80% or more.

Among all, in the reinforcing sheets for resin molded articles of Examples 7 to 10, the adhesive force $A_{1000h}$ after heating at high temperature at 100° C. for 1000 hours increases with respect to the adhesive forces $A_{1h}$ after heating at 100° C. for 1 hour and to be specific, each of the adhesive force $A_{1000h}$ after heating at high temperature at 100° C. for 1000 hours is 60 N/25 mm or more and each of the high-temperature adhesion retention ratios R is high, which is 115% or more.

TABLE 1

| | Examples/Comparative Examples | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|---|
| Reinforcing Layer (Adhesive Composition) | Hydrogenated Polymer | SEBS H1041 | 100 | — | 25 | 25 | 25 | 25 | 25 | 25 | 25 | 25 | — | — |
| | | H1052 | — | 100 | 75 | 75 | 75 | 75 | 75 | 75 | 75 | 75 | — | — |
| | SBS | T420 | — | — | — | — | — | — | — | — | — | — | 50 | — |
| | | T432 | — | — | — | — | — | — | — | — | — | — | 50 | 100 |
| | Polymer Tackifier | Bisphenol A Epoxy Resin | 100 | 100 | — | — | — | — | — | — | — | — | — | — |
| | | Alicyclic Saturated Hydrocarbon Resin ARKON P100 | — | — | 50 | 25 | 70 | 10 | — | — | — | — | — | — |
| | | ARKON M100 | — | — | — | 75 | 30 | 90 | 75 | 50 | 90 | 50 | — | — |
| | | Hydrogenated Terpene Resin Clearon P85 | — | — | 50 | — | — | — | 25 | 50 | — | — | — | — |
| | | Terpene Phenol Copolymer YS Polyster U115 | — | — | — | — | — | — | — | — | — | 50 | — | — |
| | | Hydrocarbon Petroleum Resin Petrotack 90 HM | — | — | — | — | — | — | — | — | 10 | — | 100 | — |
| | Filler | Calcium Carbonate Heavy Calcium Carbonate | 100 | 100 | 100 | 100 | 100 | 100 | 100 | 100 | 100 | 100 | 100 | — |
| | | Carbon Black Asahi #50 | 3 | 3 | 3 | 3 | 3 | 3 | 3 | 3 | 3 | 3 | 3 | 0.5 |
| | | Magnesium Silicate Talc | — | — | — | — | — | — | — | — | — | — | — | 100 |
| | | Organic Bentonite Organite | — | — | — | — | — | — | — | — | — | — | — | 10 |
| | Oxidation Inhibitor | Benzimidazoles Nocrac MB | 1 | 1 | 1 | 1 | 1 | 1 | 1 | 1 | 1 | 1 | 1 | — |
| | Curing Agent | DCDA | — | — | — | — | — | — | — | — | — | — | — | 5 |
| | | Imidazole Compound | — | — | — | — | — | — | — | — | — | — | — | 2 |
| | Thickness [mm] | | — | — | — | — | — | — | 0.62 | — | — | — | — | .30 |
| Constraining Layer | Thickness [mm] | | — | — | — | — | — | — | 0.18 | — | — | — | — | — |
| Evaluation | Bending Strength | Strength at Displacement of 1 mm [N] | 6.1 | 5.3 | 6.1 | 5.4 | 4.4 | 6.0 | 0.8 | 4.3 | 5.9 | 5.7 | 4.8 | 0.48 |
| | | After Heating at 80° C. | | | | | | | 4.8 | | | | | 2.7 |
| | | Maximum Bending Strength [N] | 70.7 | 64.6 | 80.2 | 66.6 | 58.2 | 75.2 | 58.4 | 52.2 | 66.7 | 65.1 | 46.0 | 21.5 |
| | Storage Elastic Modulus (G′) [kPa] | 25° C. (Measuring Temp.) | 2057.4 | 1553.6 | 2412.6 | 2000 | 800 | 4300 | 1100 | 820 | 4000 | 4000 | 733.7 | 270 |
| | | 80° C. (Measuring Temp.) | 487.7 | 370.0 | 429.2 | | | | | | | | 362.5 | 46 |
| | Adhesive Force*1 [N/25 mm] (Retention Ratio (%)*2) | $A_0$ 25° C. | 11 | 14 | 15 | 7.1 | 14.7 | 5.0 | 16.0 | 20.9 | 13.5 | 11.0 | 9.5 | 13 |
| | | $A_{10m}$ Heating 80° C., 10 min | 29 | 34 | 44 | 27 | 44 | 18 | 29 | 34 | 32 | 29 | 15 | 14 |
| | | $A_{1h}$ Heating 80° C., 10 min + Heating 100° C., 1 h | 70 | 69 | 72 | 71 | 69 | 82 | 61 | 72 | 66 | 51 | 45 | — |
| | | $A_{95h}$ Heating 80° C., 10 min + Heating 100° C., 95 h | 73 (104) | 62 (90) | — | — | — | — | — | — | — | — | 65 (144) | — |

TABLE 1-continued

| Examples/Comparative Examples | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|
| $A_{166h}$ | Heating 80° C., 10 min + Heating 100° C., 166 h | 72 (103) | 70 (101) | — | — | — | — | — | — | — | — | 62 (138) | — |
| $A_{287h}$ | 80° C., 10 min + Heating 100° C., 287 h | 70 (100) | 67 (97) | 74 (103) | — | — | — | — | — | — | — | 65 (144) | — |
| $A_{475h}$ | Heating 80° C., 10 min + Heating 100° C., 475 h | 69 (99) | 69 (100) | 72 (100) | — | — | — | — | — | — | — | 40 (89) | — |
| $A_{744h}$ | Heating 80° C., 10 min + Heating 100° C., 744 h | 68 (97) | 68 (99) | — | — | — | — | — | — | — | — | 24 (53) | — |
| $A_{1000h}$ | Heating 80° C., 10 min + Heating 100° C., 1000 h | 70 (100) | 64 (93) | 69 (96) | 68 (97) | 68 (98) | 81 (99) | 97 (159) | 102 (142) | 93 (141) | 60 (118) 17 (38) | | |

Adhesive Force*1: 90-degree peeling test [N/25 mm]
Retention Ratio (%)*2: $(A_{xh}/A_{1h}) \times 100$ In Table 1, values for the components in the row of "Reinforcing Layer (Adhesive Composition)" show number of blended parts.

For the components shown in Table 1, details are given in the following.

H1041: trade name "Tuftec H1041", a styrene-ethylene-butylene-styrene block copolymer, ratio of styrene/ethylene and butadiene: 30 weight %/70 weight %, MFR (190° C., 2.16 kg): 0.3 g/10 min, MFR (200° C., 5 kg): 3 g/10 min, manufactured by Asahi Kasei Chemicals Corporation.

H1052: trade name "Tuftec H1052", a styrene-ethylene-butylene-styrene block copolymer, ratio of styrene/ethylene and butadiene: 20 weight %/80 weight %, MFR (190° C., 2.16 kg): 3 g/10 min, MFR (200° C., 5 kg): 10 g/10 min, manufactured by Asahi Kasei Chemicals Corporation.

Bisphenol A Epoxy Resin: Trade name "#834", appearance: liquid state at normal temperature, viscosity of 70% butyl carbitol solution: P to U, manufactured by Japan Epoxy Resins Co., Ltd.

T420: trade name "Asaprene T420", ratio of styrene/butadiene: 30 weight %/70 weight %, MFR (190° C., 2.16 kg): 1.1 g/10 min, MFR (200° C., 5 kg): 6.5 g/10 min, manufactured by Asahi Kasei Chemicals Corporation.

T432: trade name "Asaprene T432", ratio of styrene/butadiene: 30 weight %/70 weight %, MFR (190° C., 2.16 kg): 0 g/10 min, MFR (200° C., 5 kg): 1 (g/10 min) below, manufactured by Asahi Kasei Chemicals Corporation.

ARKON M100: trade name, an alicyclic saturated hydrocarbon resin, softening point (ring and ball test) of 100° C., manufactured by Arakawa Chemical Industries, Ltd.

ARKON P100: trade name, an alicyclic saturated hydrocarbon resin, softening point (ring and ball test) of 100° C., manufactured by Arakawa Chemical Industries, Ltd.

Clearon P85: trade name, a hydrogenated terpene resin (a terpene resin), softening point (ring and ball test) of 85° C., a weight average molecular weight of 630 (GPC measurement calibrated with standard polystyrene), glass transition point (DSC method) of 28° C., manufactured by YASUHARA CHEMICAL CO., LTD.

YS Polyster U115: trade name, a terpene phenol copolymer (a terpene resin), softening point (ring and ball test) of 115° C., glass transition point (DSC method) of 57° C., a weight average molecular weight of 670 (GPC measurement calibrated with standard polystyrene), manufactured by YASUHARA CHEMICAL CO., LTD.

Petrotack 90HM: trade name, a hydrocarbon petroleum resin, softening point (ring and ball test) of 88° C., manufactured by TOSOH CORPORATION Heavy Calcium Carbonate: manufactured by MARUO CALCIUM CO., LTD.

Asahi #50: trade name, carbon black, manufactured by ASAHI CARBON CO., LTD.

Talc: trade name "Imported Talc", magnesium silicate, manufactured by SOBUE CLAY Co., Ltd.

Organite: trade name, organic bentonite, manufactured by HOJUN

Nocrac MB: trade name, 2-mercaptobenzimidazole, manufactured by OUCHI SHINKO CHEMICAL INDUSTRIAL CO., LTD.

DCDA: dicyandiamide, a foaming agent

Imidazole Compound: trade name "2MAOK", a curing agent, manufactured by SHIKOKU CHEMICALS CORPORATION While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The reinforcing sheet for a resin molded article of the present invention is used in the reinforcement of various resin molded articles.

The invention claimed is:

1. A reinforced structure of a resin molded article, comprising:
a reinforcement of the resin molded article obtained by attaching a reinforcing sheet including a constraining layer and a reinforcing layer laminated on the constraining layer to the resin molded article to be then heated at 80° C. or more to bring the reinforcing sheet of the resin molded article into close contact with the resin molded article,
wherein the constraining layer is selected from at least one of a glass cloth, a resin impregnated glass cloth, a nonwoven fabric, a metal foil, a carbon fiber, or a polyester film,
wherein the reinforcing layer is formed of an adhesive composition containing a hydrogenated polymer of a monomer containing conjugated dienes, a tackifier, and a filler,
wherein the hydrogenated polymer of a monomer containing conjugated dienes is selected from at least one of a styrene-ethylene-butylene-styrene copolymer (SEBS) or a styrene-ethylene-propylene-styrene copolymer (SEPS), and
wherein when the reinforcing sheet of the resin molded article is attached to a polypropylene plate having a thickness of 2.0 mm and is heated at 80° C. for 10 minutes, the bending strength at a displacement of 1 mm of the resulting sheet after the heating is 3 N or more and the maximum bending strength thereof is 30 N or more, and a high-temperature adhesion retention ratio R as determined by the following formula is 80% or more,
High-temperature adhesion retention ratio R=(Adhesive force $A_{1000h}$ after heating at 100° C. for 1000 hours/ Adhesive force $A_{1h}$ after heating at 100° C. for 1 hour)× 100,
wherein adhesive force $A_{1000h}$ after heating at 100° C. for 1000 hours is defined as: the adhesive force with respect to the polypropylene plate, which is obtained by attaching the reinforcing layer to the polypropylene plate to be heated at 80° C. for 10 minutes and then heated at 100° C. for 1000 hours to be thereafter measured by a 90-degree peeling test based on JIS Z0237 (in 2000) at a peeling rate of 300 mm/min, and
wherein adhesive force $A_{1h}$ after heating at 100° C. for 1 hour is defined as: the adhesive force with respect to the polypropylene plate, which is obtained by attaching the reinforcing layer to the polypropylene plate to be heated at 80° C. for 10 minutes and then heated at 100° C. for 1 hour to be thereafter measured by a 90-degree peeling test based on JIS Z0237 (in 2000) at a peeling rate of 300 mm/min.

2. The reinforced structure of the resin molded article according to claim 1, wherein the reinforcing sheet of the resin molded article is heated at 80° C. or more in advance and then, the reinforcing sheet of the resin molded article is attached to the resin molded article.

3. The reinforced structure of the resin molded article according to claim 1, wherein the tackifier contains an alicyclic saturated hydrocarbon resin.

* * * * *